United States Patent
Chartrand

(10) Patent No.: US 7,848,508 B1
(45) Date of Patent: Dec. 7, 2010

(54) TELECOMMUNICATION SYSTEM WITH IMPROVED AREA CODES

(76) Inventor: Victor Chartrand, P.O. Box 5777, La Quinta, CA (US) 92248

( * ) Notice: Subject to any disclaimer, the term of this patent is extended or adjusted under 35 U.S.C. 154(b) by 126 days.

(21) Appl. No.: 12/228,717

(22) Filed: Aug. 15, 2008

Related U.S. Application Data

(60) Provisional application No. 60/965,379, filed on Aug. 17, 2007.

(51) Int. Cl.
  H04M 7/00 (2006.01)
  H04M 1/56 (2006.01)
  H04M 15/06 (2006.01)

(52) U.S. Cl. ................ 379/221.14; 379/142.1

(58) Field of Classification Search ........... 379/221.14, 379/142.1, 211.02, 212.01; 709/206
See application file for complete search history.

(56) References Cited

U.S. PATENT DOCUMENTS

| | | | |
|---|---|---|---|
| 3,634,631 A | 1/1972 | Youngs | |
| 3,870,821 A | 3/1975 | Steury | |
| 5,018,191 A | 5/1991 | Catron et al. | |
| 5,157,719 A | 10/1992 | Waldman | |
| 5,274,693 A | 12/1993 | Waldman | |
| 5,402,481 A | 3/1995 | Waldman | |
| 5,467,390 A | 11/1995 | Brankley et al. | |
| 5,742,666 A | 4/1998 | Alpert | |
| 5,963,636 A | 10/1999 | Boakes | |
| 6,285,753 B1 | 9/2001 | Slusher | |
| 7,039,174 B1 | 5/2006 | Chartrand | |
| 2005/0074103 A1* | 4/2005 | Gosselin | 379/142.1 |
| 2006/0031364 A1* | 2/2006 | Hamilton et al. | 709/206 |
| 2006/0195540 A1* | 8/2006 | Hamilton et al. | 709/206 |

* cited by examiner

*Primary Examiner*—Thjuan K Addy
(74) *Attorney, Agent, or Firm*—Robert M. Hunter

(57) ABSTRACT

An apparatus and/or method for routing telephone calls to a communications device of a particular subscriber within an area code. A preferred embodiment is a system for routing a telephone call from a caller to a specific communications device situated in an area identified by an area code, said system comprising: means for assigning a first telephone number to a particular subscriber; and means for routing the telephone call to the specific communications device of the particular subscriber; wherein said area code is a two-character U.S. postal state abbreviation.

8 Claims, 1 Drawing Sheet

ID:
US 7,848,508 B1

TELECOMMUNICATION SYSTEM WITH IMPROVED AREA CODES

CROSS-REFERENCE TO RELATED APPLICATIONS

This application claims the benefit of U.S. Provisional Patent Application No. 60/965,379, filed Aug. 17, 2007, the disclosure of which patent application is incorporated by reference as if fully set forth herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

This invention relates to telecommunication systems and methods. In particular, the invention relates to telecommunication systems and methods that rely on improved area codes.

The present telecommunication systems rely on telephone area codes that are three-digit numbers which are assigned in a haphazard manner with no organization of any kind. Moreover, the present area codes do not reveal anything about the area being called. California, for example, has been assigned area codes ranging from a very low 209 to a very high 954.

The ongoing background art is characterized by U.S. Pat. Nos. 3,634,631; 3,870,821; 5,018,191; 5,467,390 and 7,039,174; the disclosures of which patents are incorporated by reference as if fully set forth herein.

BRIEF SUMMARY OF THE INVENTION

The purpose of a preferred embodiment of the invention is to provide an improved telecommunication system that relies on area codes that have meaning. One advantage of a preferred embodiment of the invention is that area codes would be more memorable.

In a preferred embodiment, the invention is a system and method for receiving telephone user input and routing telephone calls. In a telecommunication system that is capable of routing telephone calls to a communications device of a particular subscriber within an area code, another preferred embodiment of the invention is a system for routing a telephone call from a caller to said specific communications device, said system comprising: means for assigning a first telephone number to the particular subscriber; and means for routing the telephone call to the specific communications device of the particular subscriber said means for routing being programmed to recognize an area code; wherein said area code is a sequence of characters established in accordance with one of the schemes disclosed herein.

In a telecommunication system that is capable of routing telephone calls to a communications device of a particular subscriber within an area code, another preferred embodiment of the invention is a system for routing a telephone call from a caller to said specific communications device, said system comprising: means for assigning a first telephone number to the particular subscriber; and means for routing the telephone call to the specific communications device of the particular subscriber by recognizing the area code; wherein said area code is a two-character postal state abbreviation.

In another preferred embodiment, the invention is a telecommunication system comprising: a call routing system and a plurality of telephones that are connected to said call routing system; wherein each of said telephones is situated within an area having an area code; wherein each of said telephones comprises a keypad; and wherein said call routing system is operated by a software program that accepts a subscriber area code that is a two-character postal state abbreviation.

In another preferred embodiment, the invention is a telecommunication system comprising: a call routing system and a plurality of telephones that are connected to said call routing system; wherein each of said telephones comprises a keypad having a dedicated key that when pressed or dialed causes said telephone to send a signal to said call routing system indicating that said call is a long distance call; and wherein said call routing system is operated by a software program that accepts an area code that is a two-character postal state abbreviation. Preferably, said first dedicated key is labeled "L-D." Thus, with this embodiment, instead of a telephone user dialing the number "1" to indicate a long distance call, a new key labeled "L-D" is provided on the telephone key pad to supply a marker or symbol that replaces the "1" and when pressed or pushed indicates that the call is a long distance call.

In another preferred embodiment, the invention is a method of processing a call, the method comprising: informing a customer of a telecommunication system that is capable of routing calls to a plurality of communications devices of said customer that one of a plurality of unique sets of symbol headings is normally, but not always, associated with one type of communications device that is connectable to said telecommunication system; assigning one of a plurality of seven-digit telephone numbers available within an area code of a local area to said customer of said telecommunication system and granting said customer having a specific communications device that is connected to said telecommunication system the exclusive right to optionally use a combination comprising any one of said unique sets of symbol headings plus said seven-digit telephone number to identify said specific communications device other than a voice landline device to the other customers of said telecommunication system, said specific communications device being identified as one of said plurality of communications devices of said customer; receiving a sequence of signals representing said area code plus a specific set of symbol headings plus a specific seven-digit telephone number that has been dialed by a caller, the combination of the specific set of symbol headings plus said specific seven-digit telephone number and no other seven-digit telephone number alone identifying said specific communications device that is the destination for said call; and connecting said call to said specific communications device that is the destination for said call without the need for said telecommunication system to determine the type of communications device to which said call is directed; wherein only one specific communications device of said customer has its own seven-digit telephone number; wherein no other communications device shares a line with said voice landline device; and wherein said area code is a two-character postal state abbreviation.

In yet another preferred embodiment, the invention is a system for processing a call made to a telephone number and directed to a specific communications device to which that telephone number is assigned, the system comprising: means for announcing to a customer of a telecommunication system that is capable of routing calls to a plurality of communications devices of the customer that one of a plurality of suggested sets of symbol headings is normally associated with a single type of communications device that is connectable to a telecommunication system; means for assigning one of a plurality of telephone numbers to the customer of the telecommunication system and granting the customer having a specific communications device the exclusive right to optionally use a combination comprising any one of said suggested sets of symbol headings plus said telephone number to identify the specific communications device to other customers of the telecommunication system, the specific communications device being identified as one of the plurality of communications devices of the customer; a sequence of signals representing a specific set of symbol headings and a specific telephone number that have been dialed by a caller, the sequence of signals being the sole directory number for the specific communications device, the set of symbol headings immediately preceding the telephone number, being distinguishable from said telephone number and together with said telephone number defining a destination for said call; and a routing apparatus having a switching component and an identification component for determining the intended destination of the call and connecting the call to that destination without the need for the telecommunication system to determine the type of communications device to which the call is directed; wherein only one specific communications device of each selected customer has its own seven-digit telephone number; wherein no other communications device shares a line with said specific communications device; and wherein said area code is a two-character postal state abbreviation.

In a further preferred embodiment, the invention is a routing system for directing calls to different communications devices having identical seven-digit voice landline telephone numbers, said system comprising: an administrative subsystem comprising means for informing a customer of a telecommunication system that is capable of routing calls to a plurality of communications devices of the customer that one of a plurality of symbol headings is normally associated with each type of communications device that is connectable to a telecommunication system and means for assigning a plurality of telephone numbers to the customer of the telecommunication system and granting said the customer having a specific communications device the exclusive right to optionally use a combination comprising any one of said plurality of symbol headings plus said telephone number to identify the specific communications device to other customers of the telecommunication system, the specific communications device being identified as one of the plurality of communications devices of the customer; a network subsystem having routing-apparatus including a switching component and an identification component for processing a call to a destination, the call including a sequence of signals indicating a particular one of said plurality of symbol headings and a particular telephone number that have been dialed by a caller, the sequence of signals being the sole directory number for the specific communications device; and at least one communications device assigned to a telephone number; wherein said particular one of said plurality of symbol headings does not indicate to said routing apparatus that the specific communications device is a particular type of communications device; wherein only one specific communications device of each selected customer has its own seven-digit telephone number; wherein no other communications device shares a line with said specific communications device; and wherein said area code is a two-character postal state abbreviation.

In another preferred embodiment, in a telecommunication system that is capable of routing telephone calls to a plurality of communications devices of a subscriber that is one of a plurality of subscribers within an area code, the invention is a method for routing a telephone call to a specific communications device of the subscriber, said method for routing comprising: assigning a seven-digit telephone number to the subscriber; accepting the seven-digit telephone number alone as an indication that a caller desires to reach the specific communications device of the subscriber, said specific communications device being a first voice landline device, the specific communications device being indicated as one of the plurality of communications devices of the subscriber; accepting an 8-part or 9-part telephone number comprising a heading and the seven-digit telephone number as an indication that the caller desires to reach another specific communications device of the subscriber, said other specific communications device being reachable by the caller's dialing no other seven-digit telephone number, the other specific communications device being indicated as another one of the plurality of communications devices of the subscriber; and routing said telephone call to the specific communications device of the subscriber; wherein said heading does not indicate to said system that the call is a particular type of communication; wherein said caller has the option of using as the heading a # for a facsimile device or a second landline voice device, a * for a first cellular device, or a 2*, a 3*, a 4*, a 5*, a 6*, a 7*, a 8*, or a 9* for another cellular device; and wherein each other specific communications device does not have its own seven-digit telephone number; wherein no other communications device shares a line with said first voice landline device; and wherein said area code is a two-character postal state abbreviation.

In a telecommunication system that is capable of routing telephone calls to a plurality of communications devices of a particular subscriber, another preferred embodiment of the invention is a system for routing a telephone call from a caller to a specific communications device of the particular subscriber within an area code, said system comprising: means for assigning a first telephone number to the landline telephone of the particular subscriber, a second telephone number to a facsimile machine or second landline telephone of the particular subscriber and a third telephone number to a cellular telephone of the particular subscriber, each of the landline telephone, the facsimile or second landline telephone and the cellular telephone being one of the plurality of communications devices of the particular subscriber; and means for routing the telephone call to the specific communications device of the particular subscriber without the need for the telecommunication system to determine the type of communications device to which the telephone call is directed; wherein only one specific communications device of the particular subscriber has its own seven-digit telephone number; wherein all of said telephone numbers comprise the exact same seven numerical digits and no other numerical digits, said second telephone number further comprises a # heading digit, and said third telephone number comprise a * heading digit; wherein each specific communications device of the particular subscriber is reachable by the caller's dialing no other seven-digit telephone number; wherein no other communications device shares a line with said first landline telephone; and wherein said area code is a two-character postal state abbreviation.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE DRAWING

The features of the invention will be better understood by reference to the accompanying drawing which illustrates presently preferred embodiments of the invention. In the drawing.

Figure 1:
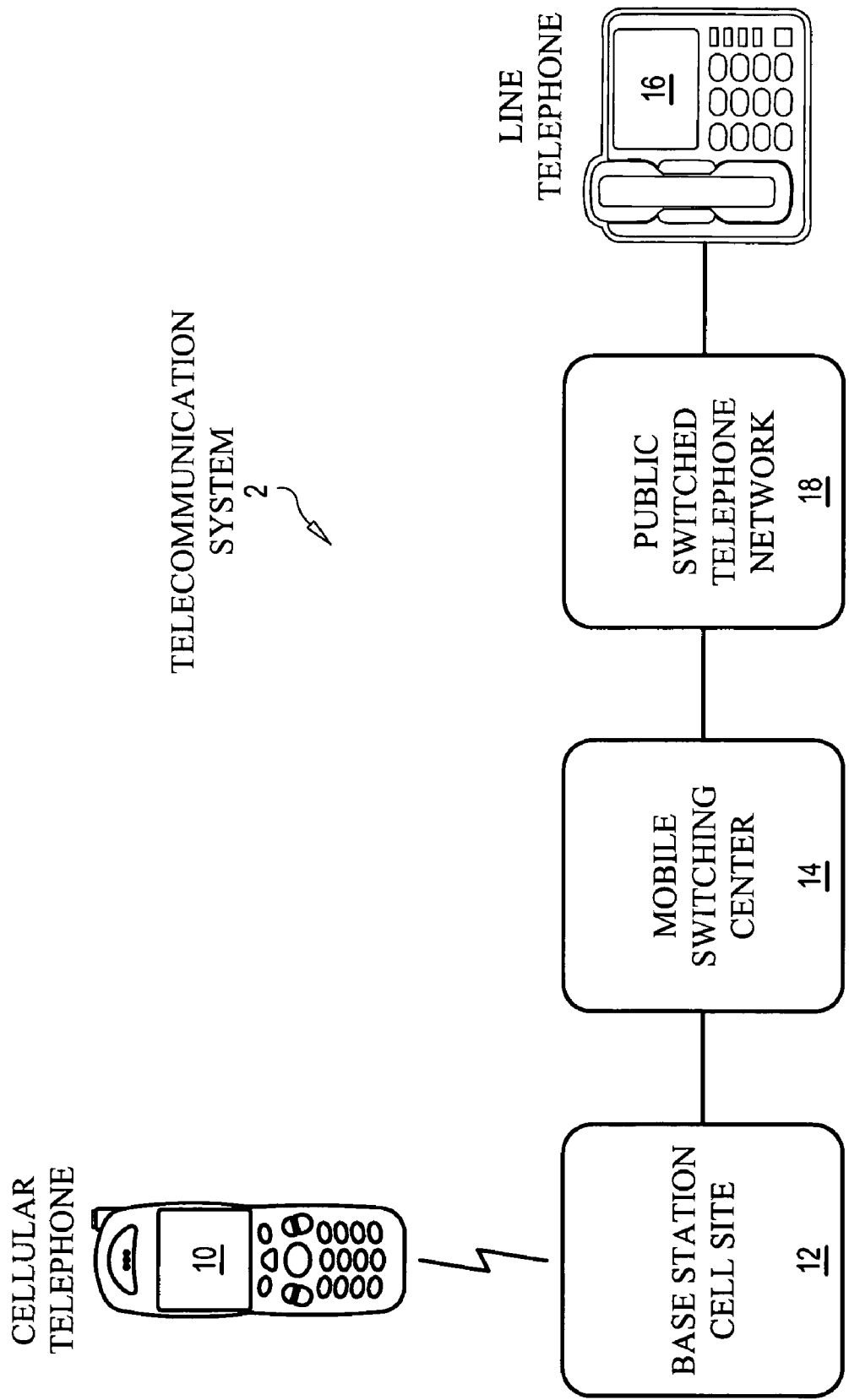
FIG. 1 is a block diagram of a telecommunication system in accordance with a preferred embodiment of the invention.

The following reference numerals are used to indicate the parts and environment of the invention on the drawings:

| | |
|---|---|
| 2 | telecommunication system |
| 10 | cellular telephone |
| 12 | base station, cell site |
| 14 | mobile switching center |
| 16 | line telephone |
| 18 | public switched telephone network |

DETAILED DESCRIPTION OF THE INVENTION

Referring to FIG. 1, a preferred embodiment of telecommunication system 2 is presented. In this embodiment, telecommunication system 2 comprises cellular telephone 10, base station or cell site 12, mobile switching center 14, line telephone 16 and public switched telephone network 18. A detailed disclosure of a preferred embodiment of a telecommunication system is presented in U.S. Pat. No. 7,039,174, which disclosure is incorporated by reference as if fully set forth herein.

In a preferred embodiment of the invention, telecommunication system 2 relies on an improved area code scheme. In one embodiment, telecommunication system 2 relies on area codes that indicate which State is encompassed by each area code.

In a preferred embodiment, each two-character area code is equivalent to the two-character U.S. postal state or possession or military "state" abbreviation (postal code). The area codes may be stored in a memory of telecommunication system 2 in alphabetical order, as follows, by state name or possession name or by military "state" name, for example:

| | Abbreviation |
|---|---|
| State/Possession | |
| ALABAMA | AL |
| ALASKA | AK |
| AMERICAN SAMOA | AS |
| ARIZONA | AZ |
| ARKANSAS | AR |
| CALIFORNIA | CA |
| COLORADO | CO |
| CONNECTICUT | CT |
| DELAWARE | DE |
| DISTRICT OF COLUMBIA | DC |
| FEDERATED STATES OF MICRONESIA | FM |
| FLORIDA | FL |
| GEORGIA | GA |
| GUAM | GU |
| HAWAII | HI |
| IDAHO | ID |
| ILLINOIS | IL |
| INDIANA | IN |
| IOWA | IA |
| KANSAS | KS |
| KENTUCKY | KY |
| LOUISIANA | LA |
| MAINE | ME |
| MARSHALL ISLANDS | MH |
| MARYLAND | MD |
| MASSACHUSETTS | MA |
| MICHIGAN | MI |
| MINNESOTA | MN |
| MISSISSIPPI | MS |
| MISSOURI | MO |
| MONTANA | MT |
| NEBRASKA | NE |
| NEVADA | NV |
| NEW HAMPSHIRE | NH |
| NEW JERSEY | NJ |
| NEW MEXICO | NM |
| NEW YORK | NY |
| NORTH CAROLINA | NC |
| NORTH DAKOTA | ND |
| NORTHERN MARIANA ISLANDS | MP |
| OHIO | OH |
| OKLAHOMA | OK |
| OREGON | OR |
| PALAU | PW |
| PENNSYLVANIA | PA |
| PUERTO RICO | PR |
| RHODE ISLAND | RI |
| SOUTH CAROLINA | SC |
| SOUTH DAKOTA | SD |
| TENNESSEE | TN |
| TEXAS | TX |
| UTAH | UT |
| VERMONT | VT |
| VIRGIN ISLANDS | VI |
| VIRGINIA | VA |
| WASHINGTON | WA |
| WEST VIRGINIA | WV |
| WISCONSIN | WI |
| WYOMING | WY |
| Military "State" | |
| ARMED FORCES AFRICA | AE |
| ARMED FORCES AMERICAS (EXCEPT CANADA) | AA |
| ARMED FORCES CANADA | AE |
| ARMED FORCES EUROPE | AE |
| ARMED FORCES MIDDLE EAST | AE |
| ARMED FORCES PACIFIC | AP |

Letter keys are already available on new cellular telephones which feature a computer keyboard. In these telephones, a standard integrated-circuit chip converts 127 input keys, including upper case letters, lower case letters, numbers, punctuation, etc. into seven-bit binary symbols, in accordance with the standard ASCII digital coding scheme. An eight-bit expanded list is also available.

The number of area codes required to serve each telecommunication system 2 varies with the population of each state and the telephone number capacity of each area code. Present art area codes each service 7.92 million subscribers who share a mixture of landline, facsimile and cellular numbers. This approach requires hundreds of area codes to serve a country the size of the United States. With the low capacity of each background art area code, a telecommunication system that relied on two-character area codes would not have a sufficient number of area codes.

In a preferred embodiment, the telecommunication system of U.S. Pat. No. 7,039,174 is used with an embodiment of the invention disclosed herein. Use of this telecommunication system allows a doubling of area code capacity and relies on eight-digit cellular numbers created by adding a * prefix to a conventional seven-digit telephone number. Each area code would then include another set of 7.92 million numbers containing the *prefix which would be reserved for use by cellular phones only. In this embodiment, two-character area codes have enough capacity to provide full service.

In another preferred embodiment, the invention calls for reducing telephone area codes from three digits to two digits. This embodiment allows the use of an eight-digit cellular phone number without changing the total number of digits presently in use (ten digits=three-digit area code plus conventional seven-digit telephone). With this embodiment, changes to the telecommunication system software are required, but no changes are required to present art telephone instrumentation or handsets.

In yet another preferred embodiment, where letters are fully available, telecommunication system 2 relies on two-character area codes that are equivalent to the two-character postal state abbreviations, such as: AL, AK, AZ, AR, CA, C1, CO, etc. The C1 area code is an extra area code for California, which could also have, in an alternative embodiment, CN for northern California and CS for southern California. The 2-digit area code plus an 8-digit cellular number would preserve the long distance telephone number at its present 10 digits.

If seven letters were used instead of seven digits for a telephone number, the capacity of each area code would increase from the present 10 million ($10^7$) to eight billion ($26^7$) accounts. With this capacity, only one two-character area code is needed per state. (The present system has two million unavailable numbers starting with 0 or 1 and 80,000 reserved numbers for an actual total of 7.92 million).

Many variations of the invention will occur to those skilled in the art. Some variations include use of area codes that are equivalent to two-character abbreviations. Other variations include use of area codes that are two-character postal state name abbreviations. All such variations are intended to be within the scope and spirit of the invention.

Although some embodiments are shown to include certain features, the applicant specifically contemplates that any feature disclosed herein may be used together or in combination with any other feature on any embodiment of the invention. It is also contemplated that any feature may be specifically excluded from any embodiment of the invention.

What is claimed is:

1. In a telecommunication system that is capable of routing telephone calls to a communications device of a particular subscriber within an area code, a system for routing a telephone call from a caller to said specific communications device, said system comprising:
   means for assigning a first telephone number to the particular subscriber; and
   means for routing the telephone call to the specific communications device of the particular subscriber by recognizing the area code;
   wherein said area code is a two-character postal state abbreviation for the desired state, possession or military state.

2. The system of claim a 1 wherein the two-character postal state abbreviation for the desired state, possession or military state is selected from the following list:

| | |
|---|---|
| ALABAMA | AL |
| ALASKA | AK |
| AMERICAN SAMOA | AS |
| ARIZONA | AZ |
| ARKANSAS | AR |
| CALIFORNIA | CA |
| COLORADO | CO |
| CONNECTICUT | CT |
| DELAWARE | DE |
| DISTRICT OF COLUMBIA | DC |
| FEDERATED STATES OF MICRONESIA | FM |
| FLORIDA | FL |
| GEORGIA | GA |
| GUAM | GU |
| HAWAII | HI |
| IDAHO | ID |
| ILLINOIS | IL |
| INDIANA | IN |
| IOWA | IA |
| KANSAS | KS |
| KENTUCKY | KY |
| LOUISIANA | LA |
| MAINE | ME |
| MARSHALL ISLANDS | MH |
| MARYLAND | MD |
| MASSACHUSETTS | MA |
| MICHIGAN | MI |
| MINNESOTA | MN |
| MISSISSIPPI | MS |
| MISSOURI | MO |
| MONTANA | MT |
| NEBRASKA | NE |
| NEVADA | NV |
| NEW HAMPSHIRE | NH |
| NEW JERSEY | NJ |
| NEW MEXICO | NM |
| NEW YORK | NY |
| NORTH CAROLINA | NC |
| NORTH DAKOTA | ND |
| NORTHERN MARIANA ISLANDS | MP |
| OHIO | OH |
| OKLAHOMA | OK |
| OREGON | OR |
| PALAU | PW |
| PENNSYLVANIA | PA |
| PUERTO RICO | PR |
| RHODE ISLAND | RI |
| SOUTH CAROLINA | SC |
| SOUTH DAKOTA | SD |
| TENNESSEE | TN |
| TEXAS | TX |
| UTAH | UT |
| VERMONT | VT |
| VIRGIN ISLANDS | VI |
| VIRGINIA | VA |
| WASHINGTON | WA |
| WEST VIRGINIA | WV |
| WISCONSIN | WI |
| WYOMING | WY |
| ARMED FORCES AFRICA | AE |
| ARMED FORCES AMERICAS (EXCEPT CANADA) | AA |
| ARMED FORCES CANADA | AE |
| ARMED FORCES EUROPE | AE |
| ARMED FORCES MIDDLE EAST | AE |
| ARMED FORCES PACIFIC | AP |

3. A telecommunication system comprising:
a call routing system and a plurality of telephones that are connected to said call routing system;
wherein each of said telephones is situated within an area having an area code;
wherein each of said telephones comprises a keypad; and
wherein said call routing system is operated by a software program that accepts a subscriber area code that is a two-character postal state abbreviation.

4. A telecommunication system comprising:
a call routing system; and
a plurality of telephones that are connected to said call routing system;
wherein each of said telephones comprises a keypad having a dedicated key that when pressed or dialed causes said telephone to send a signal to said call routing system indicating that said call is a long distance call; and
wherein said call routing system is operated by a software program that accepts an area code that is a two-character postal state abbreviation.

5. The telecommunication system of claim 4 wherein, said dedicated key is labeled "L-D."

6. A method of processing a call, the method comprising:
informing a customer of a telecommunication system that is capable of routing calls to a plurality of communications devices of said customer that one of a plurality of unique sets of symbol headings is associated with one type of communications device that is connectable to said telecommunication system;
assigning one of a plurality of seven-digit telephone numbers available within an area code of a local area to said customer of said telecommunication system and granting said customer having a specific communications device that is connected to said telecommunication system the exclusive right to optionally use a combination comprising any one of said unique sets of symbol headings plus said seven-digit telephone number to identify said specific communications device other than a voice landline device to the other customers of said telecommunication system, said specific communications device being identified as one of said plurality of communications devices of said customer;
receiving a sequence of signals representing said area code plus a specific set of symbol headings plus a specific seven-digit telephone number that has been dialed by a caller, the combination of the specific set of symbol headings plus said specific seven-digit telephone number and no other seven-digit telephone number alone identifying said specific communications device that is the destination for said call; and
connecting said call to said specific communications device that is the destination for said call without the need for said telecommunication system to determine the type of communications device to which said call is directed;
wherein only one specific communications device of said customer has its own seven-digit telephone number;
wherein no other communications device shares a line with said voice landline device; and
wherein said area code is a two-character postal state abbreviation.

7. A system for processing a call made to a telephone number and directed to a specific communications device to which that telephone number is assigned, the system comprising: means for announcing to a customer of a telecommunication system that is capable of routing calls to a plurality of communications devices of the customer that one of a plurality of suggested sets of symbol headings is associated with a single type of communications device that is connectable to a telecommunication system; means for assigning one of a plurality of telephone numbers to the customer of the telecommunication system and granting the customer having a specific communications device the exclusive right to optionally use a combination comprising any one of said suggested sets of symbol headings plus said telephone number to identify the specific communications device to other customers of the telecommunication system, the specific communications device being identified as one of the plurality of communications devices of the customer; a sequence of signals representing a specific set of symbol headings and a specific telephone number that have been dialed by a caller, the sequence of signals being the sole directory number for the specific communications device, the set of symbol headings immediately preceding the telephone number, being distinguishable from said telephone number and together with said telephone number defining a destination for said call; and
a routing apparatus having a switching component and an identification component for determining the intended destination of the call and connecting the call to that destination without the need for the telecommunication system to determine the type of communications device to which the call is directed;
wherein only one specific communications device of each selected customer has its own seven-digit telephone number; and
wherein no other communications device shares a line with said specific communications device; and wherein said area code is a two-character postal state abbreviation.

8. A routing system for directing calls to different communications devices having identical seven-digit voice landline telephone numbers, said system comprising:
an administrative subsystem comprising means for informing a customer of a telecommunication system that is capable of routing calls to a plurality of communications devices of the customer that one of a plurality of symbol headings is associated with each type of communications device that is connectable to a telecommunication system and means for assigning one of a plurality of telephone numbers to the customer of the telecommunication system and granting said customer having a specific communications device the exclusive right to optionally use a combination comprising any one of said plurality of symbol headings plus said telephone number to identify the specific communications device to other customers of the telecommunication system, the specific communications device being identified as one of the plurality of communications devices of the customer;
a network subsystem having a routing apparatus including a switching component and an identification component for processing a call to a destination, the call including a sequence of signals indicating a particular one of said plurality of symbol headings and a particular telephone number that have been dialed by a caller, the sequence of signals being the sole directory number for the specific communications device; and
at least one communications device assigned to a telephone number;
wherein said particular one of said plurality of symbol headings does not indicate to said routing apparatus that the specific communications device is a particular type of communications device;
wherein only one specific communications device of each selected customer has its own seven-digit telephone number;
wherein no other communications device shares a line with said specific communications device; and
wherein said area code is a two-character postal state abbreviation.

* * * * *